US007533084B2

(12) United States Patent
Holloway et al.

(10) Patent No.: US 7,533,084 B2
(45) Date of Patent: May 12, 2009

(54) MONITORING USER SPECIFIC INFORMATION ON WEBSITES

(75) Inventors: Lane T. Holloway, Pflugerville, TX (US); Eric T. Lambert, Wappingers Falls, NY (US); Nadeem Malik, Austin, TX (US); Benjamin J. Steele, Jr., Newburgh, NY (US); Michael E. Weissinger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 11/274,840

(22) Filed: Nov. 15, 2005

(65) Prior Publication Data
US 2007/0112735 A1 May 17, 2007

(51) Int. Cl.
G06F 7/00 (2006.01)
G06F 17/30 (2006.01)
(52) U.S. Cl. ............... 707/3; 707/9; 707/104.1; 715/968
(58) Field of Classification Search ............ 707/3, 707/9, 104.1; 715/968
See application file for complete search history.

(56) References Cited

U.S. PATENT DOCUMENTS

| | | | | |
|---|---|---|---|---|
| 6,466,940 B1* | 10/2002 | Mills | ............... | 707/102 |
| 6,999,959 B1* | 2/2006 | Lawrence et al. | ............... | 707/5 |
| 7,231,405 B2* | 6/2007 | Xia | ............... | 707/104.1 |
| 2002/0042819 A1* | 4/2002 | Reichert et al. | ............... | 707/104.1 |
| 2003/0130983 A1* | 7/2003 | Rebane | ............... | 707/1 |
| 2004/0073476 A1* | 4/2004 | Donahue | ............... | 705/10 |
| 2006/0064343 A1* | 3/2006 | Burke et al. | ............... | 705/10 |
| 2006/0200490 A1* | 9/2006 | Abbiss | ............... | 707/102 |

OTHER PUBLICATIONS

"Yahoo!Help", Yahoo!, Archived at archive.org on Jun. 19, 2004, 5 Pages.*

* cited by examiner

Primary Examiner—John R. Cottingham
Assistant Examiner—James E. Richardson
(74) Attorney, Agent, or Firm—Mark E. McBurney; Schubert Osterrieder & Nickelson PLLC (57) ABSTRACT

Methods for monitoring user specific information on websites by searching websites and displaying the results based at least partially on geographical region are disclosed. Embodiments may include receiving a search request including one or more keywords and searching a database based on the received search request to generate search results, where the search results include an indication of one or more websites each with an associated geographical region. Embodiments may also include generating a geographical user interface page based on the search results, where the page includes an indication of the one or more opinion websites superimposed on a map based on their associated geographical region. Embodiments may further include transmitting the generated geographical user interface page. Further embodiments may include generating geography-based directed advertising based on the search results or receiving and storing a rating for a website from a user.

7 Claims, 6 Drawing Sheets

MONITORING USER SPECIFIC INFORMATION ON WEBSITES

FIELD OF INVENTION

The present invention is in the field of data processing systems and, in particular, to methods for monitoring opinions on websites and facilitating searches of an opinion database by users.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM or DVD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. The use of mobile computing devices, such as notebook PCs, personal digital assistants (PDAs), sophisticated wireless phones, etc., has also become widespread. Mobile computing devices typically exchange some functionality or performance when compared to traditional PCs in exchange for smaller size, portable power, and mobility.

The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet or other networks, such as local area networks. Users and organizations often create Internet websites to provide information and opinions as to various subjects to others via the Internet or to facilitate discussions or commentary on these subjects. These websites may include web logs (known as 'blogs'), bulletin boards, forums, chat rooms, or other sites.

Many individuals, organizations, and businesses desire to know how their actions, products, statements, or other public actions are perceived by members of the public. Often, these groups can find information on the Internet relating to the opinions of others using search engines or other mechanisms. For example, an entity may search the Internet using a search engine and find a website where a customer has positively reviewed their product. An example search engine for searching the content of blogs is http://www.technorati.com. The dramatic increase in popularity of websites such as blogs, as well as their sheer number of websites, often makes global Internet searching for customer reactions (or other opinions) highly inefficient. An entity utilizing a traditional search engine to determine public opinions relating to the entity, its products, its actions, etc., may be forced to sort through hundreds or thousands of search results to glean useful information. Moreover, the entity may not know or be able to easily ascertain the value of the website hosting the opinion. There is, therefore, a need for an efficient and effective system to facilitate searching of websites for opinion information.

SUMMARY OF THE INVENTION

The problems identified above are in large part addressed by methods for searching websites. Embodiments may include receiving a search request including one or more keywords and searching an opinion database based on the received search request to generate search results, where the search results include an indication of one or more opinion websites each with an associated geographical region. Embodiments may also include generating a geographical user interface page based on the search results, where the page includes an indication of the one or more opinion websites superimposed on a map based on their associated geographical region. Embodiments may further include transmitting the generated geographical user interface page. Further embodiments may include generating geography-based directed advertising based on the search results or receiving and storing a rating for an opinion website from a user.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, methods for monitoring user specific information on websites by searching websites and displaying the results based at least partially on geographical region are disclosed. Embodiments may include receiving a search request including one or more keywords and searching a database based on the received search request to generate search results, where the search results include an indication of one or more websites each with an associated geographical region. Embodiments may also include generating a geographical user interface page based on the search results, where the page includes an indication of the one or more opinion websites superimposed on a map based on their associated geographical region. Embodiments may further include transmitting the generated geographical user interface page. Further embodiments may include generating geography-based directed advertising based on the search results or receiving and storing a rating for a website from a user.

The system and methodology of the disclosed embodiments provides for monitoring and searching for user specific information on websites, such as by searching for opinion information on opinion websites, and providing the results organized by the geographic region of the website. By allowing users to search websites and to see search results displayed based on the geographic region of the websites, users may advantageously be able to track opinions or other user specific information based on geographical regions. A political adviser using the disclosed system, for example, might track opinions of her candidate based on geographical region and use that information to redirect advertising, speeches, or other campaign resources. In some embodiments, the search hits may be superimposed on a map based on their geographical region, so that the user may efficiently find websites that meet their search criteria in any geographic region. The disclosed systems and methodologies accordingly provide an effective and efficient means to monitor opinions or other user specific information on websites.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Figure 1:
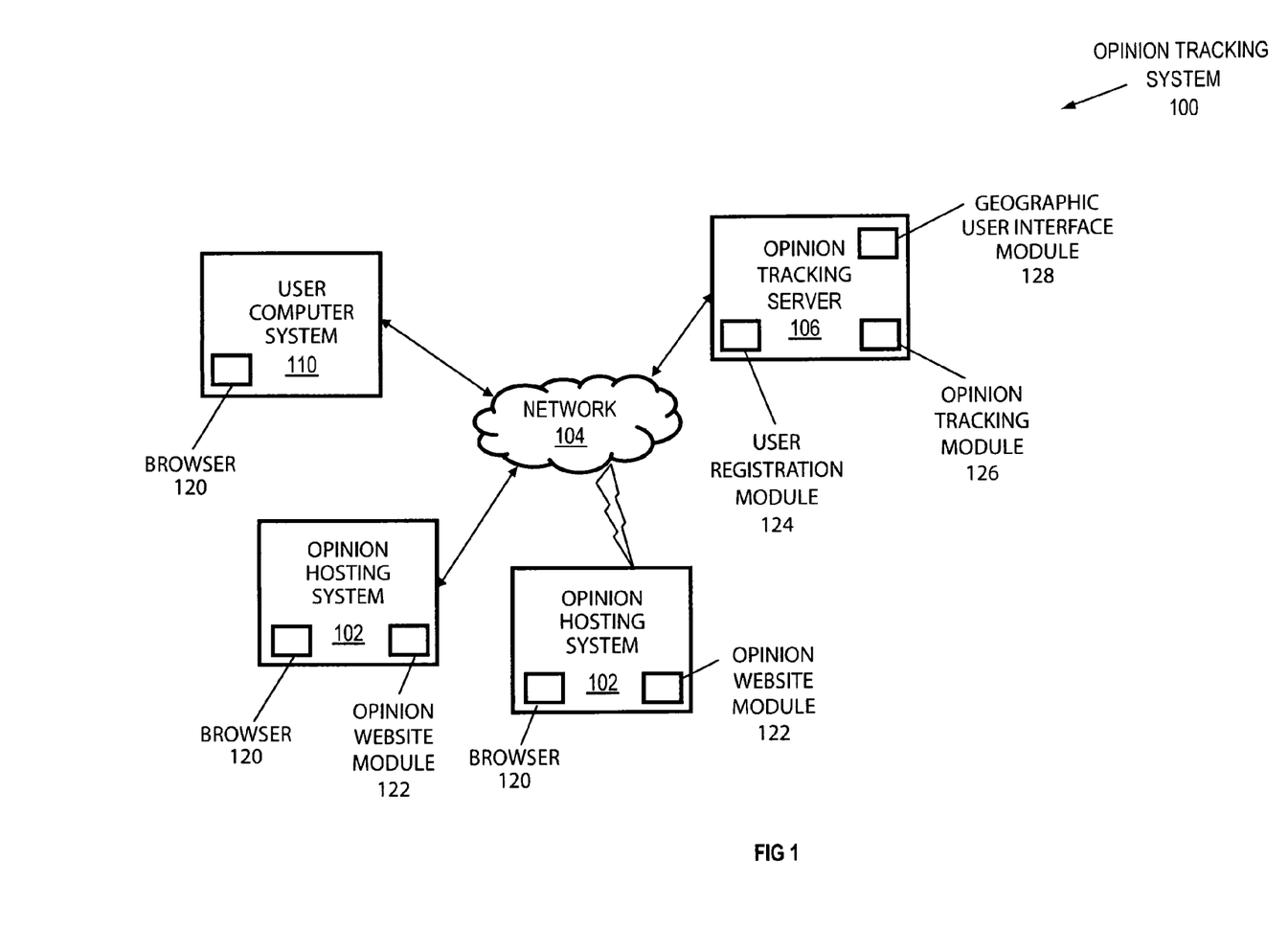
FIG. 1 depicts an environment for an opinion tracking system for tracking opinion information on a plurality of websites according to one embodiment.

Turning now to the drawings, FIG. 1 depicts an environment for an opinion tracking system for tracking opinion information on a plurality of websites according to one embodiment. In the depicted embodiment, the opinion tracking system 100 includes a plurality of opinion hosting systems 102 in communication with a network 104. Each opinion hosting system 102 may host an opinion website providing a variety of opinion content to other systems on the network 104. The depicted opinion tracking system 100 also includes an opinion tracking server 106 in communication with network 104 for tracking opinion information on the plurality of opinion hosting systems 102 and providing opinion information to registered users. Each registered opinion hosting system 102 may have an associated geographical area, allowing opinion information to be advantageously searched and organized based on geography. In some embodiments, the opinion tracking system 100 may also include one or more user computer systems 110 to allow users of any computer system to register and receive opinion information from the opinion tracking server 106.

In the opinion tracking system 100, the opinion hosting systems 102 and the opinion tracking server 106 may be located at the same location, such as in the same building or computer lab, or could be remote. While the term "remote" is used with reference to the distance between the components of the opinion tracking system 100, the term is used in the sense of indicating separation of some sort, rather than in the sense of indicating a large physical distance between the systems. For example, any of the components of the opinion tracking system 100 may be physically adjacent or located as part of the same computer system in some network arrangements.

The opinion hosting system 102 may be any computer system adapted to host or otherwise provide an opinion website. Opinion hosting system 102 may include one or more personal computers, workstations, servers, mainframe computers, notebook or laptop computers, desktop computers, PDAs, set-top boxes, mobile phones, wireless devices, or the like. In some embodiments, the opinion hosting system 102 may be a computer system as described in relation to FIG. 2. The opinion hosting system 102 may be in wired or wireless communication with network 104 so that its opinion website may be accessed via network 104. Each opinion hosting system 102 may include a browser 120 and/or an opinion website module 122. Browser 120 may be a graphical browser such as Microsoft Corporation's Internet Explorer™, Netscape Communication Corporation's Navigator™, Mozilla Foundation's Mozilla, Apple Corporation's Safari™, Opera Software ASA's Opera™, etc. Browsers, at their most basic level of operation, permit users to connect to a given network site, download informational content from that site, and display that information to the user. To view additional information, the user of the browser 120 designates a new network address (such as by selecting a link) whose contents then replace the previously displayed information on the user's computer display. As will be described in more detail subsequently, a user of the opinion hosting system 102 may use its browser 120 to access functionality of the opinion tracking server 106, such as registration of the user's opinion site, searching, or other functions.

The opinion website module 122 may be a software application that provides an opinion website accessible by other computers systems in communication with network 104. In one embodiment, the opinion website module 122 provides the website in HyperText Markup Language (HTML) or similar format. An opinion website may be any website that contains content, including traditional websites, web logs ('blogs'), bulletin boards, forums, chat rooms, informational websites, or any other site. In some embodiments, the content may include articles, conversations, commentary, discussions, reviews or other information. This content may prove useful to, for example, the subject of the content as an indication of how a product, political position, etc., is being received by the public. Typical opinion websites may include political-oriented websites, websites offering commentary or review on products (e.g., technical products such as stereos, camera, automobiles, etc.), review websites (e.g., book reviews, movie reviews, etc.), or other websites. Opinions may also include content broader than positions on a particular subject and may thus include any type of commentary. Other example opinion websites may include websites focused on interest or hobbies (e.g., pets, sports, etc.).

Network 104 may be any type of data communications channel, or any combination of data communication channels, such as the Internet, an intranet, a LAN, a WAN, an Ethernet network, a wireless network, a proprietary network, or a broadband cable network. In some embodiments, network 104 may be the Internet and opinion hosting systems 102 and the opinion tracking server 106 may have a permanent or temporary connection to the Internet. Those skilled in the art will recognize, however, that the invention described herein may be implemented utilizing any type or combination of data communications channel(s).

The opinion tracking server 106 may be executing on one or more personal computers, workstations, servers, mainframe computers, notebook or laptop computers, desktop computers, or the like. In some embodiment, the opinion tracking server 106 may be a computer system as described in relation to FIG. 2. An example opinion tracking server 106 is an International Business Machine Corporation (IBM) eServer® server. In the depicted embodiment, the opinion tracking server 106 includes a user registration module 124, an opinion tracking module 126, and a geographic user interface module 128.

The user registration module 124 may receive and manage requests from opinion website owners (i.e., opinion hosting system 102 owners) to register the opinion website with the opinion tracking server 106. As part of the registration process, the user registration module 124 may receive an indication of a geographic region (or multiple areas) associated with the opinion website that its owner is registering. A geographic region might be a political area (e.g., state, city, congressional district), zip code or other mailing area, or any other type of area. The user registration module 124 may also facilitate tracking different tiers of registration, receipt of other types of information from a user (e.g., credit card information, user preferences, etc.), or other user management tasks. A user or opinion website owner may, for example, submit information about their interests (e.g., hobbies, political affiliation, favorite TV shows, etc.). In some embodiments, the user registration module 124 may, however, only use sensitive information provided by users in a generalized fashion so as to maintain the privacy of the users. In exchange for registration and providing information, the user may be provided by benefits such as searching capabilities, enhanced searching, etc., as will be described in more detail subsequently. The user registration module 124 may also receive and manage requests from users without opinion websites (i.e., users on user computer systems 110). In some embodiments, registered users may also have access to the search capabilities of the opinion tracking server 106, such as when they have paid a subscription fee or one-time fee.

The opinion tracking module 126 may search opinion websites hosted by opinion hosting systems 102 to generate opinion information. In some embodiments, the opinion tracking module 126 may only search opinion websites that are registered with the opinion tracking server 106 (as described previously in relation to the user registration module 124). Opinion information may include any content found during the opinion website search of registered sites. The opinion tracking module 126 may determine associated geographic regions for different parts of the opinion information based on registration information gathered by the user registration module 124. The opinion information gathered from a particular website, for example., may be associated with the geographical region associated with that website. Search results generated by the opinion tracking module 126 may accordingly be correlated to the particular geographic region associated with each result, providing enhanced information for many applications. A search may be initiated by a user such as the owner of a registered opinion website, a registered user of a user computer system 110, or other user. The opinion tracking module 126 may also receive and tracking ratings of different opinion websites by users so that the rating of an opinion website may also be optionally considered in the generation of search results.

The geographic user interface module 128 may generate a geographic user interface page (as described subsequently in relation to FIG. 6) based on search results generated by the opinion tracking module 126. The geographic user interface page may be transmitted or otherwise provided to a user for review of search results for their requested search. In some embodiments, the graphic user interface page provides a graphical display of the search results superimposed onto a map so that the user can determine the location of the search results on the map, providing enhancements to the usability of the search result data. In some embodiments, an indication of the search result (a hit on a particular opinion website) may be superimposed on a map in the location of the geographic region associated with the opinion website. A search hit for a blog based in Las Vegas, Nev., could be superimposed over the map depiction of the city (or the zip code, state, country, etc., depending on the fidelity of the map and search results). This advantageously allows users to see search results pictorially on a map so that they can focus on geographic regions in which they are interested or so that they can see how the search hits are distributed geographically. In some embodiments, multiple search hits are combined so that indications of multiple opinion websites are combined together. A map region with ten hits in this example could be a brighter color or otherwise emphasized when compared to a map region with no hits.

As discussed previously, the opinion tracking system 100 may also include one or more user computer systems 110 in communication with network 104, each of which may also include a browser 120. The user computer systems 110 may include one or more personal computers, workstations, servers, mainframe computers, notebook or laptop computers, desktop computers, PDAs, set-top boxes, mobile phones, wireless devices, or the like. In some embodiments, the user computer system 110 may be a computer system as described in relation to FIG. 2. In contrast to an opinion hosting system 102, the user computer system 110 typically does not host an opinion website and instead represents users without opinion websites utilizing the opinion tracking system 100. A user of a user computer system 110 may use browser 120 to register with the opinion tracking server 106, to submit search requests or view search results, or perform other tasks. A user of a user computer system 110 (or an opinion hosting system 102) may submit a search request that includes one or more keywords as well as other information that may limit or define the search. A keyword may be the subject of a search and multiple keywords may optionally be linked using Boolean or other logic. For example, a user may search for 'youth soccer' as a phrase, the name of a product, the name of a political candidate, a breed of dog, or any other interest. By combining keywords, a user may further focus their search using 'and', 'or', 'same sentence', 'same paragraph', or other logical connectors. The user may limit or define a search based on time limitations (e.g., before or after a particular date), geographical limitations, subject matter limitations (e.g., only blogs, no chat rooms), etc.

The systems and methodologies of the disclosed embodiments provide an efficient and effective mechanism for a user to monitor opinion websites. The opinion tracking server 106 may monitor the content of a plurality of opinion websites and correlate the content to the geographic region associated with the source opinion website. The opinion tracking server 106 may thus provide search results based on the geographic region, providing for additional value to users. The opinion tracking server 106 may also provide additional enhancements, such as by giving higher status to opinion websites that are well regarded, sorting by interest, or other factors. The user may view the search results via a geographic user interface page that may provide a graphical interface for viewing the search results superimposed onto a map. By providing search results tied to the geographic region of their origin, the opinion tracking system 100 of the disclosed embodiments advantageously allows for tracking of opinions or other content based on the geographic region of their origin and for viewing the geographic distribution of opinions.

Example uses of the disclosed systems and methodologies can be widely varied. In one example, a campaign team may use the disclosed system to search for opinion websites with content about their candidate or their opponent by choosing the appropriate keyword(s). The resulting geographical user interface page may show any discussion of their content superimposed over a map of the political region. By reviewing the results, they may determine the efficacy of the political advertising by noting areas with higher numbers of search hits and area with little discussion. The campaign team may optionally be able to drill down into the results to see the actual hits so that they may determine whether commentary is positive or negative or so they can see what subjects are most relevant for particular areas. This improved information may allow the campaign team to redirect campaign resources more efficiently. In another example, a user may desire to find information about their particular breed of pet in their local area. Using the disclosed systems, the user may search for their pet breed and view the results from their local area, allowing them to efficiently find local blogs or other opinion websites that match their interest without having to review exhaustive search results that cover the entire Internet.

Figure 2:
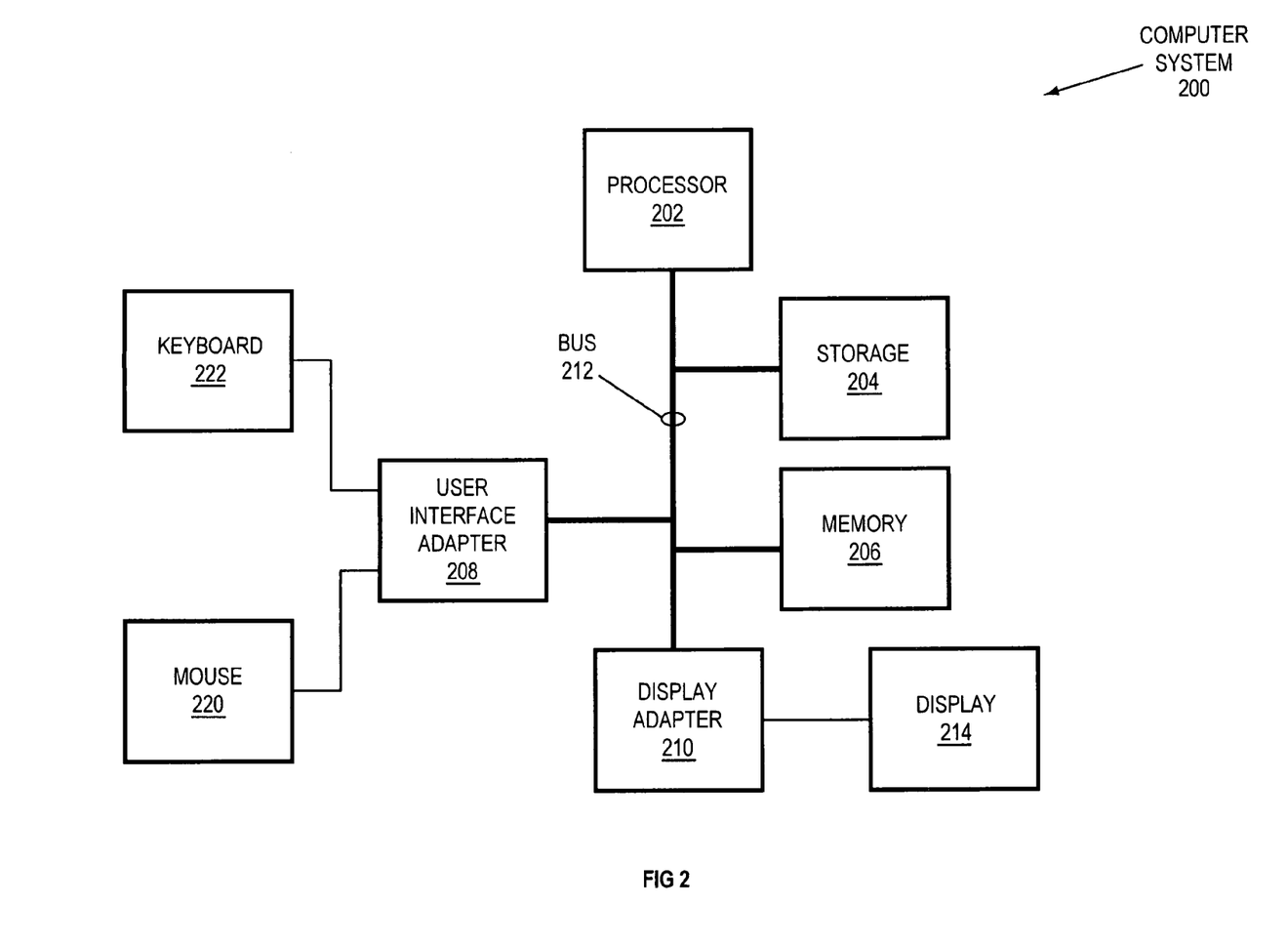
FIG. 2 depicts a block diagram of one embodiment of a computer system suitable for use as a component of the opinion tracking system, such as an opinion hosting system, opinion tracking server, or user computer system.

FIG. 2 depicts a block diagram of one embodiment of a computer system 200 suitable for use as a component of the opinion tracking system 100, such as an opinion hosting system 102, opinion tracking server 106, or user computer system 110. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 214. The bus 214 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc.

The bus 212 may also connect the processor 202 to a display, such as an LCD display or CRT monitor, via the display adapter 210.

Figure 3:
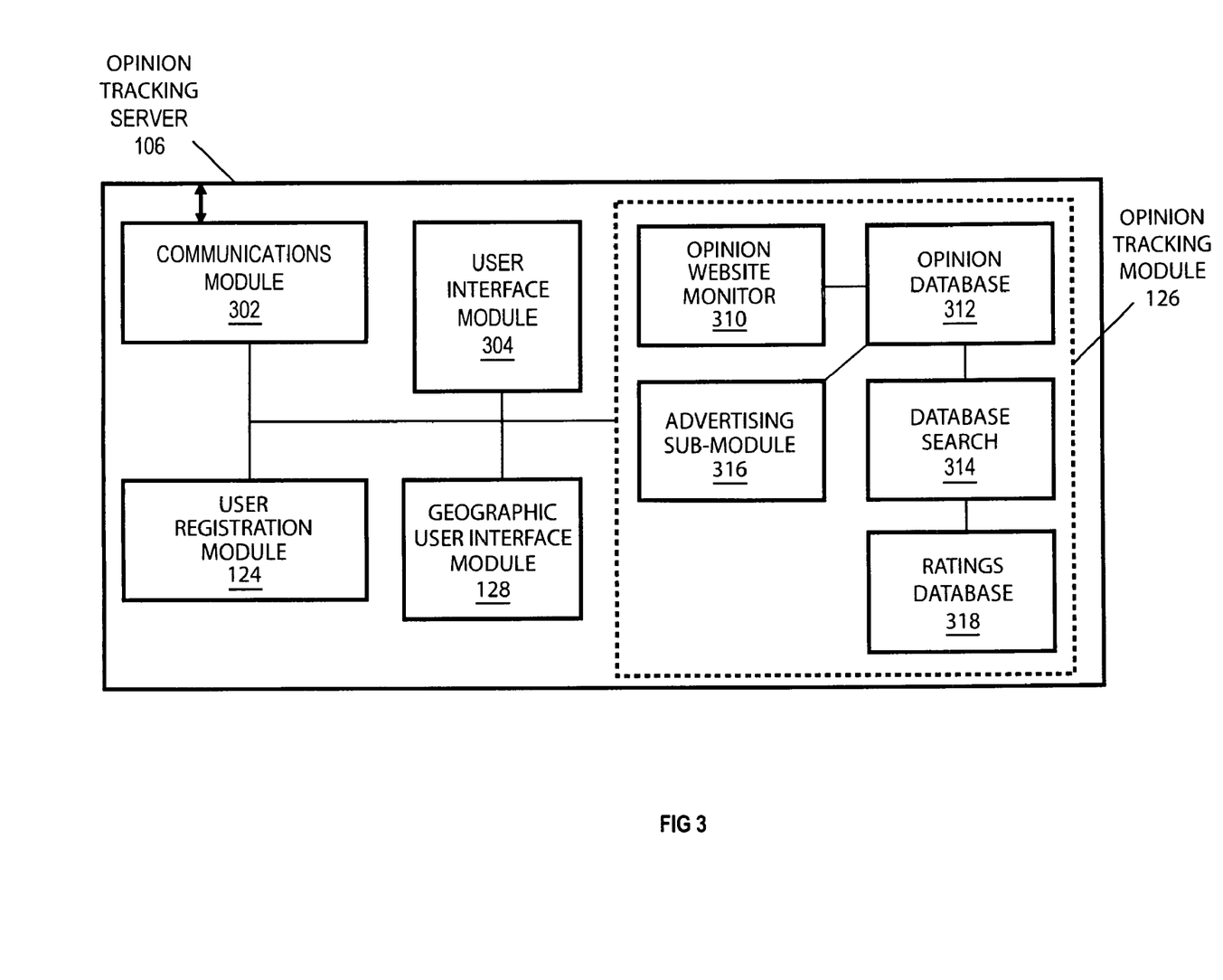
FIG. 3 depicts a conceptual illustration of software components of an opinion tracking server of the opinion tracking system according to one embodiment.

FIG. 3 depicts a conceptual illustration of software components of an opinion tracking server of the opinion tracking system according to one embodiment. The opinion tracking server 106 of the depicted embodiment includes a user registration module 124, an opinion tracking module 126, a geographic user interface module 128, a communications module 302, and a user interface module 304. The communications module 302 may facilitate communications to and from the opinion tracking server 106 and other components of the opinion tracking system 100. The user interface module 304 may receive user input from user input devices such as a mouse 220 or keyboard 222 and may transmit an indication of the received input to other components of the opinion tracking server 106, as well as providing information via a display 214 of the opinion tracking server 106 to an administrator or other user. The user registration module 124 and the geographic user interface module 128 are described in detail in relation to FIG. 1 and the description will not be repeated here in the interest of brevity.

The opinion tracking module 126 may include sub-modules such as an opinion website monitor 310, opinion database 312, database search sub-module 314, advertising sub-module 316, and ratings database 318 to perform its tasks. The opinion website monitor 310 may search (or crawl) opinion websites to determine their content and may then store the found content, or opinion information, in the opinion database 312. Opinion information may include any content found during the opinion website search of registered sites. In some embodiments, the opinion website monitor 310 only searches opinion websites that are registered with the user registration module 124. The opinion website monitor 310 may search the opinion websites using any methodology and may search, for example, at set periods of time (e.g., hourly) or upon request. In some embodiments, for example, the opinion website monitor 310 may receive an indication from an opinion hosting system 102 that the opinion website has been updated, such as by opinion websites with Really Simple Syndication (RSS) feeds. In other embodiments, an owner of an opinion website may inform the opinion website monitor 310 that new content has been added.

The opinion website monitor 310 may also associate a geographic region for different parts of the opinion information based on registration information gathered by the user registration module 124. The opinion information gathered from a particular website, for example, may be associated with the geographical region associated with that website. Search results generated by the opinion website monitor 310 may accordingly be correlated to the particular geographic region associated with each result.

The database search sub-module 314 may perform searches of the contents of the opinion database 312 to generate search results upon receiving a request for a search. The search request received from a user may include one or more keywords as well as other limiting parameters, such as restrictions on date (e.g., opinions from the last 24 hours, etc.), on the type of opinion site (e.g., only blogs and chat rooms), on acceptable ratings (e.g., only highly-rated websites), etc. Accordingly, in some embodiments, the database search sub-module 314 may restrict its search to items in the opinion database 312 associated with a particular geographic region, while in other embodiments it may restrict its search to opinion database 312 content that is related to a particular interest (as specified by users). The database search sub-module 314 may limit its search based on the tier of registration of the user requesting the search, as premium users may have enhanced capabilities when compared to others. Premium users, for example, may be able to get the most recent opinion information while other users may only be able to search opinion information that is hours or days old.

The database search sub-module 314 may utilize any type of search methodology to perform searches. The search results may include opinion website content as well as information associated with the opinion website where the content originated, such as an associated geographic region, user interest, or rating of the opinion website. A search 'hit' could include, in one example, an indication that the keyword was found on an opinion website based in the Austin, Tex., area that is rated three stars out of four and is owned by a user with an interest in politics and photography.

As noted previously, the opinion tracking module 126 may also include an optional rating database 318 to store rating information associated with opinion websites. In some embodiments, the rating database 318 may store any ratings received from users for any registered opinion websites. The ratings may include a numerical or other scaled rating, a positive/negative rating, or other type of rating. Any ratings received by the opinion tracking module 126 may be stored in the ratings database 318, and the database search sub-module 314 may access the ratings database 318 as necessary to perform a search and to generate search results.

The opinion tracking module 126 may also include an optional advertising sub-module 316 to generate advertisements for inclusion with the search results or geographical user interface. When search results are generated, the advertising sub-module 316 may generate targeted advertising based on, for example, the geographic region of the user, the geographic region selected for the search, or the interests of the user. A search result focused on the state of New Hampshire, for example, may have advertising focused on local restaurants or vacation destinations. The geographic-focused nature of search results according to the disclosed embodiments may provide a particularly desirable market for many types of advertising when compared to traditional search engines or other Internet-based advertising. Accordingly, an operator of an opinion tracking server 106 may optionally provide advertising using an advertising sub-module 316 as a source of revenue.

Many aspects of the disclosed system may provide sources of revenue for owners or operators of an opinion tracking server 106. Once source of revenue may be registration fees for either owners of opinion websites or users who desire to search. Premium services, such as enhanced searching or search result display, may also provide additional revenue. Many users who desire to track the efficacy of marketing or advertising campaigns, political campaigns, product releases, etc., may find the disclosed system particularly valuable. Directed advertising may also provide a source of revenue as many users of the disclosed system will be a precisely determined target set (i.e., people looking for a certain type of thing in a particular place or having a specific interest).

Figure 4:
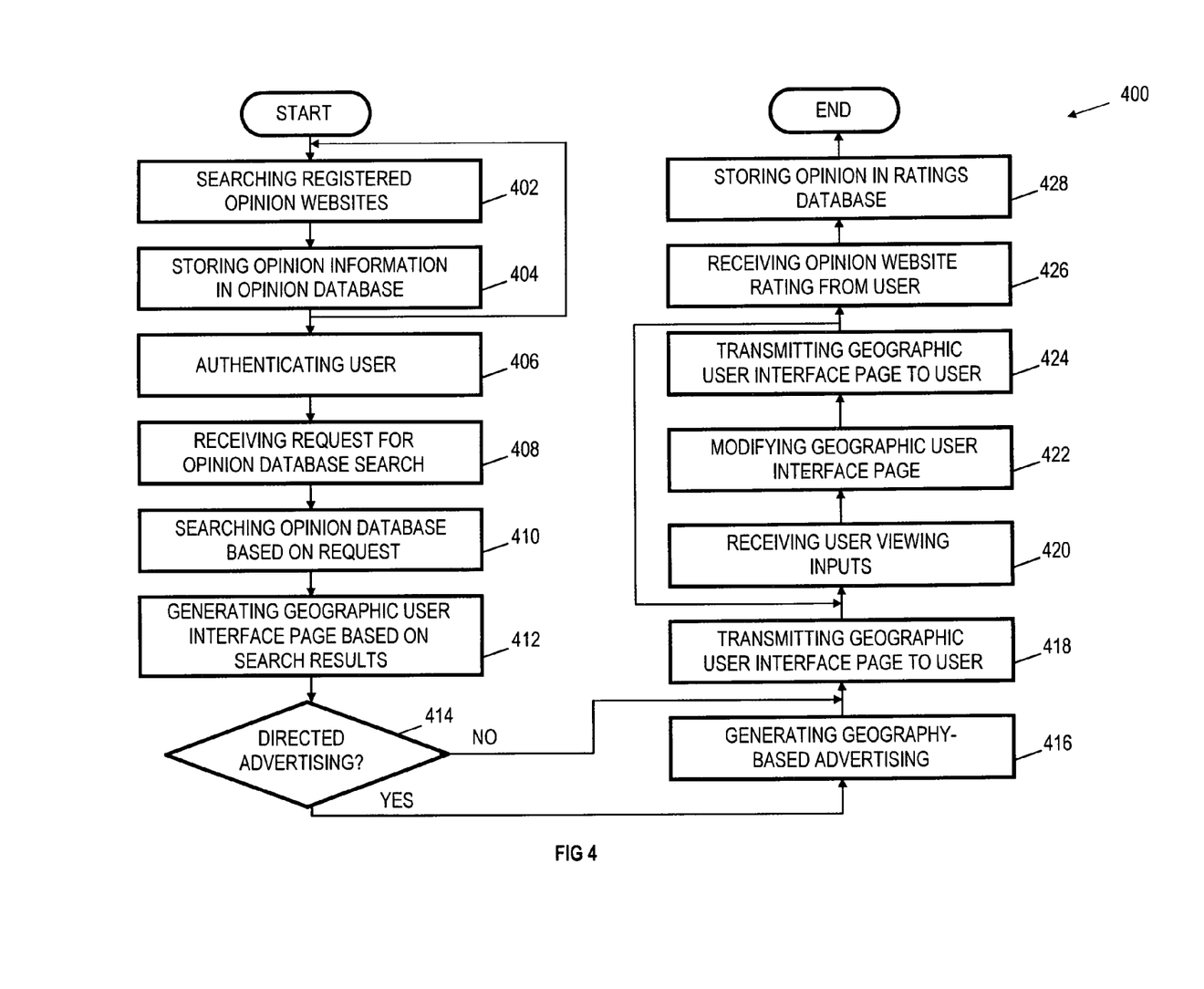
FIG. 4 depicts an example of a flow chart for searching opinion websites and generating a geographic user interface page based on the search results according to one embodiment.

FIG. 4 depicts an example of a flow chart 400 for searching opinion websites and generating a geographic user interface page based on the search results according to one embodiment. The method of flow chart 400 may be performed, in one embodiment, by components of an opinion tracking server 106 such as the opinion tracking module 126 and its sub-modules. Flow chart 400 begins with element 402, where an opinion website monitor 310 of the opinion tracking module 126 may search the registered opinion websites for their content at element 402. In one embodiment, the opinion website monitor 310 may accomplish this by crawling the registered websites using the methodologies substantially similar to those of traditional search engines. In some embodiments, the opinion website monitor 310 may search registered opinion websites at variable periods of time, such as by conducting searches every hour, day, or other timeframe. In other embodiments, the opinion website monitor 310 may perform its search in response to receiving a notification from the owner of a registered opinion website, such as via an RSS feed or direct communication with a user. The opinion website monitor 310 may also use a combination of methodologies for searching. For example, the opinion website monitor 310 may perform daily searches of content for all sites, hourly searches for premium websites (e.g., websites whose owners have paid for a premium service), and other searches in response to notifications of an updated website. After gathering opinion information via the searching of element 402, the opinion website monitor 310 may store the opinion information in an opinion database 312 at element 404. Elements 402 and 404 and the gathering of information for the opinion database 312 may, in some embodiments, occur continually so that relatively updated information may be provided to users of the opinion tracking system 100.

Once an opinion database 312 has been established, the method of flow chart 400 may continue to optional element 406, where the user registration module 124 of the opinion tracking server 106 may authenticate a user. At element 406, the user registration module 124 may receive, for example, a user identification and password from a user via the user interface module 304. In an alternative embodiment, the user need not be authenticated and instead any user may request searches of the opinion database. Registered users, for example, may receive special privileges such as more timely or higher quality searches while the general public may be limited to requesting basic searches (such as to test out the system before signing up). In another alternative embodiment, the user registration module 124 may recognize multiple tiers of registration and provide benefits and search capability based on the user's tier (as correlated to the user's registration information).

At element 410, the opinion tracking module 126 may receive via the user interface module 304 a request for an opinion database 312 search from a user. The received user request may include one or more keywords to form the base of the search as well as search limitations such as a starting date, an ending date, subject matter or interest, type of opinion website, geographical region, or other limitation. After receiving the user request, the database search sub-module 314 of the opinion tracking module 126 may, at element 410, search the opinion database 312 based on the received request to generate search results. The search results may include an indication of matching or similar elements in the opinion database 312, which may be considered 'hits' of the search engine. The database search sub-module 314 may accordingly limit its search, and its generated search results, based on the requested limitations. In some embodiments, the generated search results are not limited by geographic region so that the user may select at the time of viewing the geographic region for which they wish to view results. In other embodiments, the generated search results are limited by geographic region per the user request. The search results may optionally include rating information for opinion websites found in the search.

Once the database search sub-module 314 has generated search results, the method of flow chart 400 continues to element 412, where the geographic user interface module 128 generates a geographic user interface page based on the generated search results. The geographic user interface page may include an indication of some or all of the search result 'hits'. For example, the most relevant group of hits may be shown with a user option to see subsequent hits. The geographic user interface page may include content such as the name of the opinion website that resulted in a hit, an indication of the content of the opinion website, the geographical region associated with the opinion website that was a hit, a clickable link to the opinion website, a rating for the opinion website, or other information for each of the 'hits' in the search results. In some embodiments, the geographical user interface page may be displayed as a list of search hits for viewing by a user.

Figure 6:
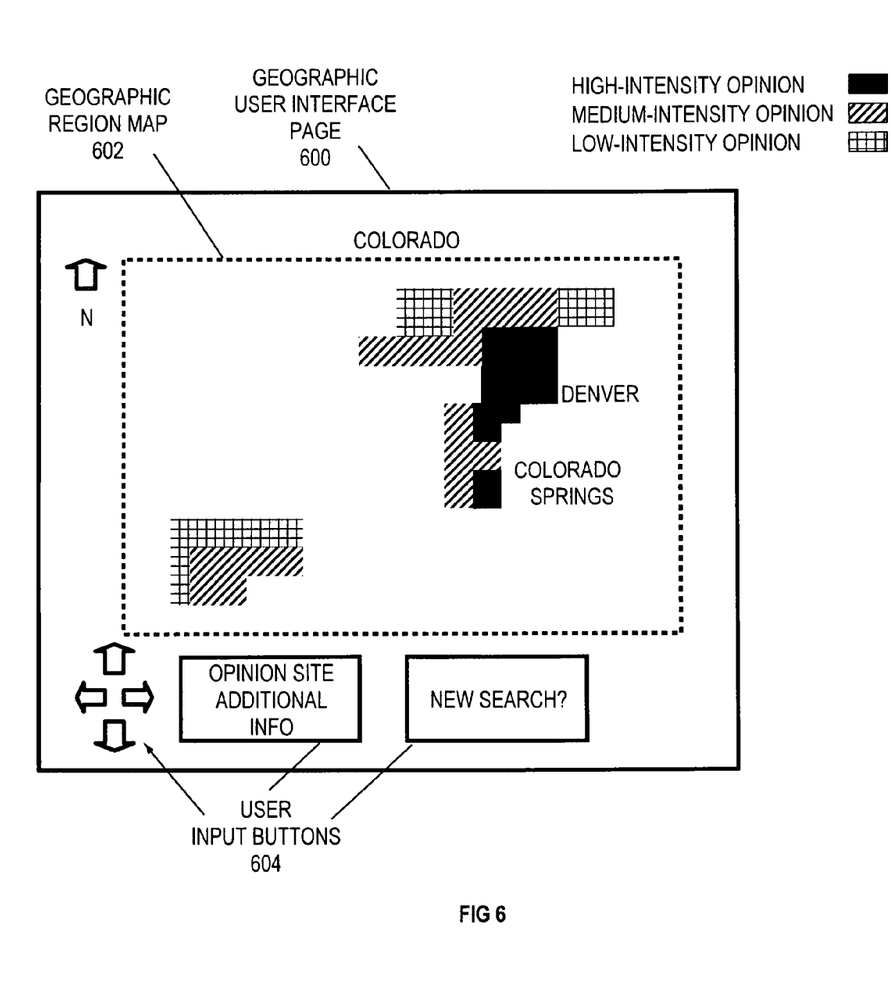
FIG. 6 depicts an example of a geographical user interface page according to one embodiment.

In other embodiments, the geographical user interface page may be a graphical display of the search results superimposed on a map, as described in more detail in relation to FIG. 6. In these embodiments, an indication of the search results may be superimposed over the part of the map related to their associated geographic region. A hit for an opinion website associated with Manhattan, for example, may be superimposed over the portion of a map indication Manhattan. Similarly, other search results may be superimposed over the appropriate portion of the map, providing a graphical representation of the search results. A user searching for opinions of their product, for example, could see on the graphical user interface page a graphical indication of where each search result was located, allowing them to see where the most hits were occurring. The search results may also have additional features, such as a clickable link to the hit that allows a user to select the search result on the graphical user interface page and be directed to the relevant section of the opinion website.

The graphical user interface page may provide also provide more sophisticated indicators of the relevance of search results. For example, search hits that are considered more relevant may be a particular color, a brighter or more intense color, or have other visual cues as to their importance. Similarly, a geographical region with a larger number of hits may have a different, brighter, or deeper color so that users know that many results were found there. The intensity of the displayed search results may accordingly indicate the relevance or number of the hits from that region. In another embodiment, the display of search results on the map may also indicate the rating of the opinion websites resulting in the hits, providing another valuable indication of the quality of the hit. Search hits from highly-rated opinion websites in this embodiment may have some sort of visual emphasis, such as particular or brighter colors, flashing symbols, etc.

In an alternative embodiment depicted at elements 414 and 416, the opinion tracking module 126 may add directed advertising to the geographical user interface page. At element 414, the advertising sub-module 316 of the opinion tracking module 126 may determine whether directed advertising will be used and, at element 416, the advertising sub-module 316 may generate geography-based advertising for inclusion on the geographical user interface page. The geography-based advertising may include advertising based on the geographical region of the search results and/or the user requesting the search. The advertising sub-module 316 may, for example, generate advertisements for entities (e.g., stores, restaurants, tourist destinations, etc.) geographically near one or more of the search hits. The advertising sub-module 316 may further refine its advertisements based on the interests or other information about the user. A user interested in photography and searching for opinions in the Chicago area, for example, could be given advertisements for camera stores in the greater Chicago area.

After generation of a geographic user interface page (and possibly directed advertising), the opinion tracking server 106 may transmit (via the user interface module 304) the generated page and any advertisements to the user at element 418. As described in relation to FIG. 5, the user may view the search results on the geographic user interface page and may also interact with the page by changing the view, selecting links, requesting viewing of a different geographical region, etc. If the user does change their view, the opinion tracking server 106 may receive at element 420 an indication of the user viewing inputs (i.e., their requested changes). The geographic user interface module 128 may then modify the geographic user interface page at element 422. The geographic user interface module 128 may, for example, generate a zoomed version of the page, or make any other modification to the page. After modifying the page, the geographic user interface module 128 may transmit the modified geographic user interface page to the user. If the user has more inputs, the method of flow chart 400 may return to element 420 for continued modifications, allowing the user to advantageously manipulate the geographical user interface page.

In another alternative embodiment, the opinion tracking server 106 may also receive opinion website rating information from a user at element 426. This may occur when a user decides to rate an opinion website, such as after they view its contents as part of the search results. The opinion tracking module 126 may store any received rating information in the ratings database 318 at element 428, after which the method of flow chart 400 terminates.

Figure 5:
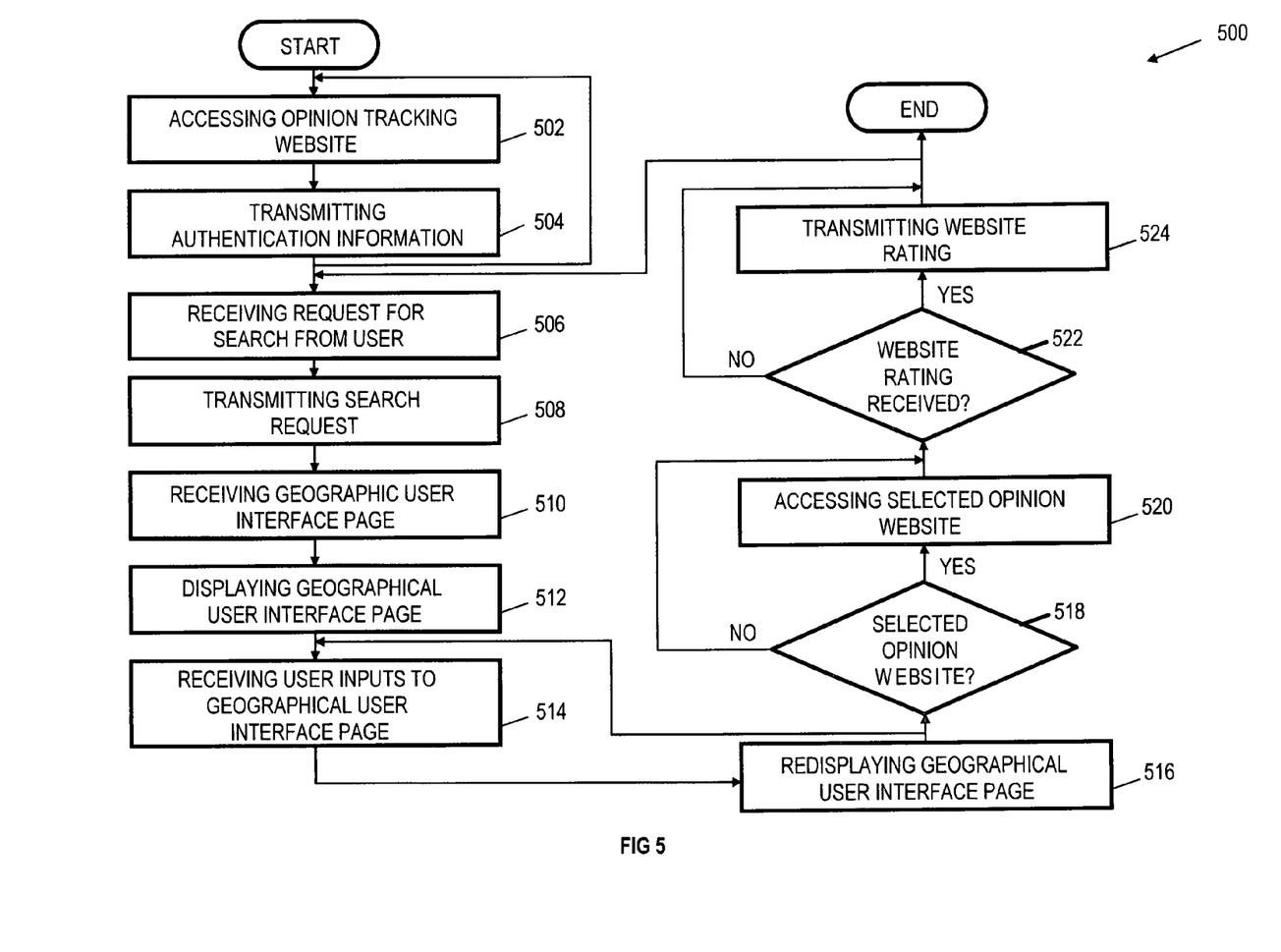
FIG. 5 depicts an example of a flow chart for searching for opinions on websites and displaying the results to a user according to one embodiment.

FIG. 5 depicts an example of a flow chart 500 for searching for opinions on websites and displaying the results to a user according to one embodiment. The method of flow chart 500 may be performed, in one embodiment, by components of a user computer system 110 or an opinion hosting system 102. Flow chart 500 begins with element 502, where the user computer system 110 and/or opinion hosting system 102 may access an opinion tracking website, such as in response to a user selecting a link in their browser 120, typing in the address of the opinion tracking website, etc. The opinion tracking website may, in some embodiments, be the Internet home page for the opinion tracking server 106 or the service offered as part of the opinion tracking system 100, and may be a Uniform Resource Locator (URL) or other network address. The user computer system 110 and/or opinion hosting system 102 may optionally transmit authentication information to the opinion tracking server 106 at element 504, such as when authentication information is stored in a cookie. Alternatively, the user computer system 110 and/or opinion hosting system 102 may receive authentication information such as a password or user identification (ID) from a user. In another alternative embodiment, no authentication information is required for access to the opinion hosting website.

At element 506, the user computer system 110 and/or opinion hosting system 102 may receive a request for a search from a user and may then transmit a search request to the opinion tracking server 106 at element 508. The user computer system 110 and/or opinion hosting system 102 may, in some embodiments, modify the information received from a user as necessary to create a search request suitable for the opinion tracking server 106. The request for a search from the user may include information such as one or more keywords, geographical limitations, time limitations, minimum rating limitations, etc. The user computer system 110 and/or opinion hosting system 102 may then wait until receiving a geographical user interface page from the opinion tracking server 106 at element 510. After receiving the geographical user interface page from the opinion tracking server 106, the user computer system 110 and/or opinion hosting system 102 may display the geographical user interface page to the user at element 512, such as by using browser 120 software and a physical display 214 to show the page.

In some embodiments, a user may modify their view of the geographical user interface page by scrolling, zooming in or out, moving the view to another portion of the map, changing the number of search results displayed, requesting viewing of different types of emphasis (e.g., show highest rated results in a flashing font), or other inputs. At element 514, the user computer system 110 and/or opinion hosting system 102 may receive user inputs to modify the view of the geographical user interface page from the user. The user computer system 110 and/or opinion hosting system 102 may then redisplay the geographical user interface page at element 516. The user may optionally make more inputs at this point, returning flow chart 500 to element 514. In an alternative embodiment, the user computer system 110 and/or opinion hosting system 102 may, in response to receiving user inputs, generate a search request based on the inputs, transmit the search request, and receive and display a geographical user interface page, relying on the opinion tracking server 106 to modify the geographical user interface page. This may be particularly useful for relatively complicated changes from the user.

The user computer system 110 and/or opinion hosting system 102 of some embodiments may allow users to select opinion websites from the search results on the geographical user interface page and be redirected to those opinion websites. At decision block 518, the user computer system 110 and/or opinion hosting system 102 of these embodiments may determine whether a user has selected an opinion website (such as by clicking a link on the geographical user interface page) and, if the user has so selected, may at element 520 access the selected opinion website. Accessing the selected opinion website may include redirecting the user's browser 120 to the selected website, opening a new browser 120 window for the selected opinion website, creating a tab or frame for the selected opinion website, etc.

The user computer system 110 and/or opinion hosting system 102 of some embodiments may allow users to submit ratings of opinion websites. At decision block 522, the user computer system 110 and/or opinion hosting system 102 may determine whether a website rating was received and, if so, the user computer system 110 and/or opinion hosting system 102 may transmit the website rating to the opinion tracking server 106 at element 524 for processing, after which the method of flow chart 500 either terminates or returns to element 506 for further processing. Ratings may represent the user's opinion of the quality of an opinion website (and its opinions). A high average rating may represent an overall positive view of an opinion website while a large number of ratings may represent a higher influence, or readership, of a site. The users who are allowed to submit ratings may be limited in some embodiments, such as only allowing users who have registered or have an opinion website to submit ratings. In one embodiment, users may only submit positive ratings for opinion websites to help prevent some forms of inappropriate or misleading behavior. Given that opinion websites may often differ in opinion (such as political opinion websites), limiting negative reviews helps prevent users from giving poor ratings to opinion websites that they do not like.

FIG. 6 depicts an example of a geographical user interface page according to one embodiment. As described previously, an opinion tracking server 106 may generate a geographic user interface page to display search results superimposed on a map. The geographic user interface page 600 of the disclosed embodiment includes a map of a geographic region 602 with optional user input buttons 604. The user input buttons 604 may allow users to input information such as requests for additional information or a new search, scroll the view of the geographical user interface page 600, zoom in or out, etc.

The depicted geographic region map 602 includes an example of a map of Colorado with the two cities of Denver and Colorado Springs. The search results are superimposed on the map with different colors or patterns representing different intensities (e.g., number or quality of search hits) of opinions from opinion websites. In the depicted embodiment, the user will see that there are high-intensity opinion areas near the cities of Denver and Colorado Springs with medium-intensity opinions around those cities and in the southwest corner of the state. Low-intensity opinions also exist near the same regions and the remainder of the state had non-existent opinion website hits (or hits below a specified threshold). A user searching for opinions on their new marketing campaign, for example, could see from the generated geographic user interface page 600 that the marketing was very effective in the Denver and Colorado Springs area and somewhat effective in the southwest portion of the state, and less effective elsewhere. A user may, in some embodiments, click on the geographic region map 602 to see more details about the search results. A user clicking on the high-intensity opinion area, for example, may see a list of the search hits, each of which may also have an embedded link allowing the user to see the content on the opinion website that caused the hit. The search hits may, in one embodiment, be listed in order of decreasing relevance. One skilled in the art will recognize that many different geographic user interface page designs or formats may be utilized within the scope of the invention and the depicted page is only one example.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for monitoring opinions on websites. It is understood that the form of the invention shown and described in the detailed description and the drawings are to be taken merely as examples. It is intended that the following claims be interpreted broadly to embrace all the variations of the example embodiments disclosed.

What is claimed is:

1. A method for searching websites, the method comprising:
    Receiving at an opinion tracking server, a plurality of requests to register with an opinion database one or more opinion websites, the requests to register the opinion websites each comprising an indication of a geographical region associated with each opinion website to be registered;
    registering the requested opinion websites with the opinion database;

searching the registered opinion websites for opinion information;

tracking the opinion information by correlating it to a geographic region associated with its registered opinion website;

storing the opinion information relating to the registered opinion websites and an indication of its correlated geographic region in the opinion database;

receiving a plurality of user ratings for one or more registered opinion websites;

storing any positive received opinion website user ratings and automatically rejecting any negative received opinion website user ratings;

receiving a search request to search the opinion database from a user associated with a registered opinion website, the search request comprising one or more keywords and a minimum acceptable rating for search results;

searching the opinion database based on the received search request to generate search results, the search results comprising an indication of one or more opinion websites each with an associated geographical region that satisfies the search request and only each of the opinion websites having an associated rating that is equal to or exceeds the minimum acceptable rating for search results;

generating a geographical user interface page based on the search results, the geographical user interface page comprising an indication of the one or more opinion websites superimposed on a map based on their associated geographical region, the map having a plurality of geographical regions each having a displayed intensity corresponding to both the number of opinion websites from the search results that are located within each geographical region and any associated ratings for the opinion websites from the search results;

transmitting the generated geographical user interface page;

receiving an indication that a user has selected an opinion website superimposed on the map; and redirecting the user to the selected opinion website via a link embedded in the generated geographical user interface page.

2. The method of claim 1, wherein searching the registered opinion websites comprises searching the registered opinion websites in response to one or more of a passage of a period of time or a notification of a change in an opinion website.

3. The method of claim 1, further comprising before receiving the search request to search the opinion database, authenticating a user.

4. The method of claim 1, further comprising:
generating geography-based directed advertising based on the search results; and
adding the geography-based advertising to the generated geographical user interface page.

5. The method of claim 1, further comprising:
receiving viewing inputs from a user;
modifying the geographic user interface page based on the received viewing inputs; and
transmitting the modified geographic user interface page.

6. The method of claim 1, wherein the one or more opinion websites comprise one or more of a blog, chat room, traditional website, bulletin board, forum, or information website.

7. The method of claim 1, wherein the geographical user interface page comprises an indication of a rating for at least one opinion website.

\* \* \* \* \*